United States Patent
Shimizu et al.

(10) Patent No.: US 12,247,833 B2
(45) Date of Patent: Mar. 11, 2025

(54) WALL SHAPE MEASUREMENT DEVICE

(71) Applicant: DENSO CORPORATION, Kariya (JP)

(72) Inventors: Naotsugu Shimizu, Kariya (JP); Seiya Fujitsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 388 days.

(21) Appl. No.: 17/653,436

(22) Filed: Mar. 3, 2022

(65) Prior Publication Data

US 2022/0187063 A1 Jun. 16, 2022

Related U.S. Application Data

(63) Continuation of application No. PCT/JP2020/033279, filed on Sep. 2, 2020.

(30) Foreign Application Priority Data

Sep. 6, 2019 (JP) .................. 2019-163205

(51) Int. Cl.
*G01B 15/04* (2006.01)
*G01S 13/931* (2020.01)

(52) U.S. Cl.
CPC ............ *G01B 15/04* (2013.01); *G01S 13/931* (2013.01)

(58) Field of Classification Search
None
See application file for complete search history.

(56) References Cited

U.S. PATENT DOCUMENTS

| 2015/0309171 | A1* | 10/2015 | Ishimori | ........... B60W 30/0956 342/27 |
|---|---|---|---|---|
| 2017/0345312 | A1 | 11/2017 | Shimizu et al. | |
| 2018/0172814 | A1* | 6/2018 | Okazaki | ................. G01S 13/04 |
| 2018/0181818 | A1 | 6/2018 | Shimotani et al. | |
| 2018/0300562 | A1* | 10/2018 | Yamada | ................ G06V 20/58 |

FOREIGN PATENT DOCUMENTS

JP 5992574 B1 * 9/2016

* cited by examiner

*Primary Examiner* — Ladimir Magloire
*Assistant Examiner* — David C. Schultz
(74) *Attorney, Agent, or Firm* — Maschoff Brennan

(57) ABSTRACT

A wall shape measurement device includes a wall distance acquisition part, a wall shape calculation part, a sudden change determination part, and an extrapolation part. The wall distance acquisition part repeatedly determines whether a wall-like object installed along the road is detected, and acquires, in response to the wall-like object being detected, a wall distance value indicating the distance to the wall-like object. The wall shape calculation part calculates a plurality of wall shape values using the traveling track of the vehicle and a plurality of past wall distance values. The sudden change determination part determines whether the wall distance value is suddenly changed, based on a preset sudden change determination condition. In response to the wall distance value being suddenly changed, the extrapolation part extrapolates wall shape values after it is determined that the wall distance value is suddenly changed.

9 Claims, 12 Drawing Sheets

FIG.9
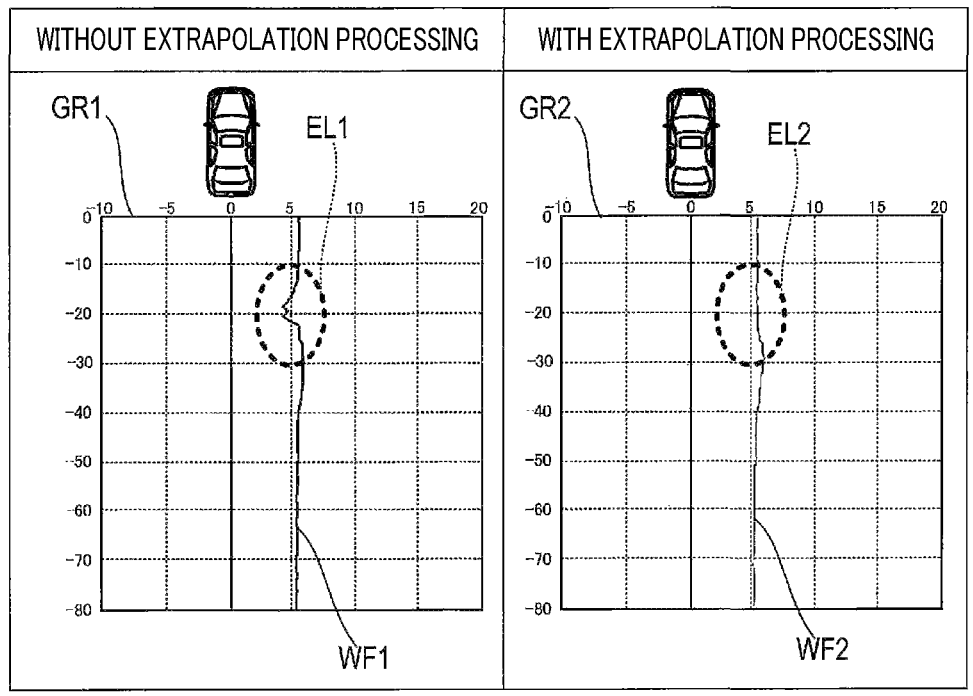
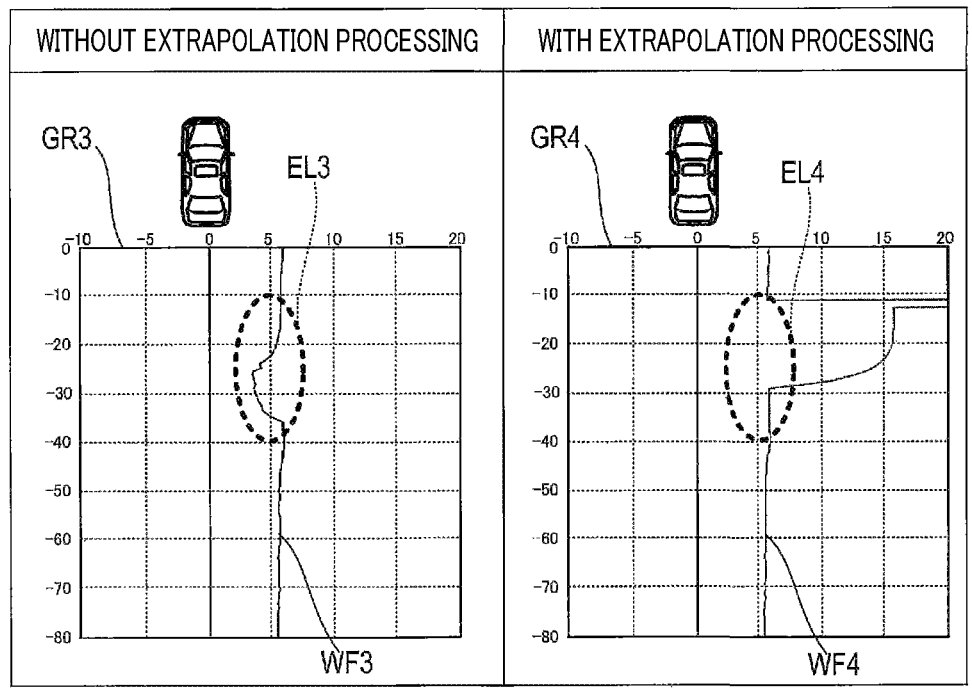

WALL SHAPE MEASUREMENT DEVICE

CROSS-REFERENCE TO RELATED APPLICATION

This application is the U.S. bypass application of International Application No. PCT/JP2020/033279 filed on Sep. 2, 2020 which designated the U.S. and claims priority to Japanese Patent Application No. 2019-163205 filed on Sep. 6, 2019, the contents of both of which are incorporated herein by reference.

TECHNICAL FIELD

The present disclosure relates to a wall shape measurement device that measures the shape of a wall installed along the road.

BACKGROUND

JP 2016-85567 A discloses acquiring wall distance information indicating the result of detecting the distance to a wall present on a lateral side of a vehicle from a radar device mounted in the vehicle, and calculating the wall shape based on the wall distance information and the traveling track of the vehicle.

SUMMARY

One aspect of the present disclosure is a wall shape measurement device that is configured to be mounted to a vehicle, and that includes a wall distance acquisition part, a wall shape calculation part, a sudden change determination part, and an extrapolation part.

The wall distance acquisition part is configured to repeatedly determine whether a wall-like object installed along the road on which the vehicle is traveling is detected, using a reception signal obtained by receiving radar waves transmitted and reflected in a preset detection region around the vehicle, and to acquire, in response to the wall-like object being detected, a wall distance value indicating the distance to the wall-like object using the reception signal.

The wall shape calculation part is configured to calculate a plurality of wall shape values indicating the positions of a plurality of locations on the surface of the wall-like object using the traveling track of the vehicle and a plurality of past wall distance values repeatedly acquired by the wall distance acquisition part.

The sudden change determination part is configured to determine whether the wall distance value acquired by the wall distance acquisition part is suddenly changed, based on a preset sudden change determination condition.

The extrapolation part is configured to, when the sudden change determination part determines that the wall distance value is suddenly changed, extrapolate wall shape values after the sudden change determination part determines that the wall distance value is suddenly changed.

BRIEF DESCRIPTION OF THE DRAWINGS

The above features of the present disclosure will be made clearer by the following detailed description, given referring to the appended drawings. In the accompanying drawings:

FIG. 9 is a view illustrating the difference in the wall shape due to the presence of extrapolation processing;

DETAILED DESCRIPTION OF THE PREFERRED EMBODIMENTS

Figure 1:
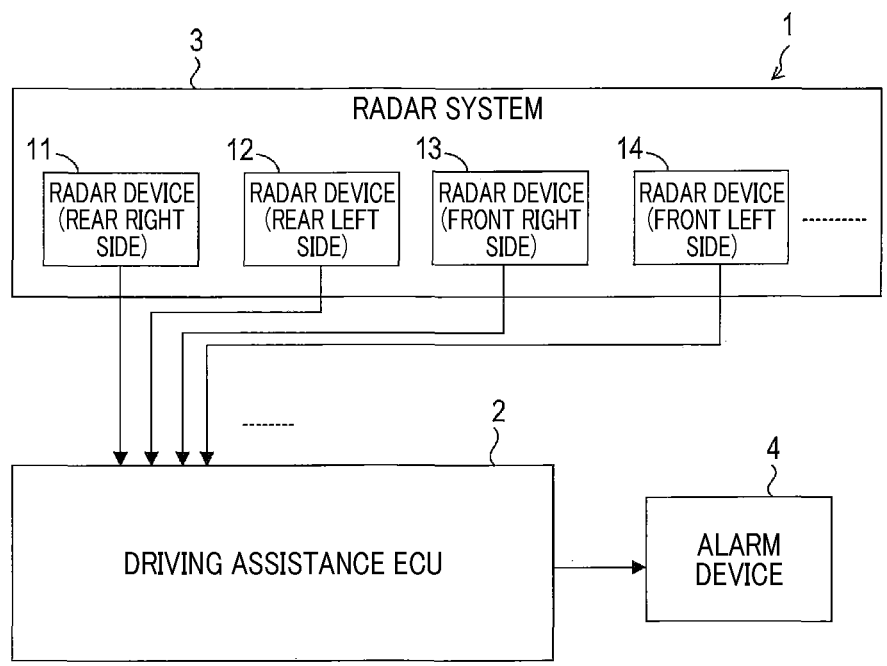
FIG. 1 is a block diagram illustrating the configuration of an in-vehicle system.

As a result of detailed examination by the inventor, the technique disclosed in JP 2016-85567 A was found to have a problem that in a situation where there is another vehicle between the vehicle equipped with the radar device (hereinafter "own vehicle") and the wall, when the side surface of the other vehicle is incorrectly recognized as the wall, the wall shape is calculated to be closer to the own vehicle than to the actual position of the wall, and the wall shape is miscalculated.

The present disclosure suppresses the wall shape from being calculated to be closer to the own vehicle than to the actual position of the wall.

One aspect of the present disclosure is a wall shape measurement device that is configured to be mounted to a vehicle, and that includes a wall distance acquisition part, a wall shape calculation part, a sudden change determination part, and an extrapolation part.

The wall distance acquisition part is configured to repeatedly determine whether a wall-like object installed along the road on which the vehicle is traveling is detected, using a reception signal obtained by receiving radar waves transmitted and reflected in a preset detection region around the vehicle, and to acquire, in response to the wall-like object being detected, a wall distance value indicating the distance to the wall-like object using the reception signal.

The wall shape calculation part is configured to calculate a plurality of wall shape values indicating the positions of a plurality of locations on the surface of the wall-like object using the traveling track of the vehicle and a plurality of past wall distance values repeatedly acquired by the wall distance acquisition part.

The sudden change determination part is configured to determine whether the wall distance value acquired by the wall distance acquisition part is suddenly changed, based on a preset sudden change determination condition.

The extrapolation part is configured to, when the sudden change determination part determines that the wall distance value is suddenly changed, extrapolate wall shape values after the sudden change determination part determines that the wall distance value is suddenly changed.

When the wall distance value is suddenly changed, the thus-configured wall shape measurement device of the present disclosure extrapolates wall shape values after the wall distance value is suddenly changed. Therefore, for example, when a situation where there is no other vehicle between the own vehicle and the wall is changed to a situation where there is another vehicle between the own vehicle and the wall, the wall distance value is suddenly changed when the side surface of the other vehicle is incorrectly recognized as the wall, and the wall shape measurement device of the present disclosure calculates wall shape values after the wall distance value is suddenly changed, based on the wall shape value before the wall distance value is suddenly changed. As a result, the wall shape measurement device of the present disclosure can suppress the wall shape from being calculated to be closer to the own vehicle than to the actual position of the wall.

First Embodiment

The first embodiment of the present disclosure will be described below with reference to the drawings.

The in-vehicle system 1 of the present embodiment comprises a driving assistance ECU 2, a radar system 3, and an alarm device 4, as shown in FIG. 1. ECU is an abbreviation of Electronic Control Unit. In the present embodiment, the in-vehicle system 1 is mounted in a four-wheeled vehicle. Hereinafter, the vehicle in which the in-vehicle system 1 is mounted is also referred to as "own vehicle."

The radar system 3 comprises a plurality of radar devices 11, 12, 13, 14 . . . . In the present embodiment, the radar device 11 is installed on the rear right side of the vehicle, the radar device 12 is installed on the rear left side of the vehicle, the radar device 13 is installed on the front right side of the vehicle, and the radar device 14 is installed on the front left side of the vehicle.

The radar devices 11 and 12 are arranged so that their detection regions include a rear direction along the straight traveling direction of the own vehicle, and a horizontal direction orthogonal to the straight traveling direction. The radar device 11 acquires information related to objects present on the right side and rear right side of the vehicle. The radar device 12 acquires information related to objects present on the left side and rear left side of the vehicle.

The radar devices 13 and 14 are arranged so that their detection regions include a front direction along the straight traveling direction of the own vehicle, and a horizontal direction orthogonal to the straight traveling direction. The radar device 13 acquires information related to objects present on the right side and front right side of the vehicle. The radar device 14 acquires information related to objects present on the left side and front left side of the vehicle.

As the target detection system employed in the radar devices, for example, various detection systems, such as FMCW system and two-frequency CW system, are known. The radar devices 11, 12, 13, 14 . . . of the present embodiment are configured as the so-called "millimeter wave radars" in the FMCW system.

All of the radar devices 11, 12, 13, 14 . . . that constitute the radar system 3 basically have the same configuration and function.

Figure 2:
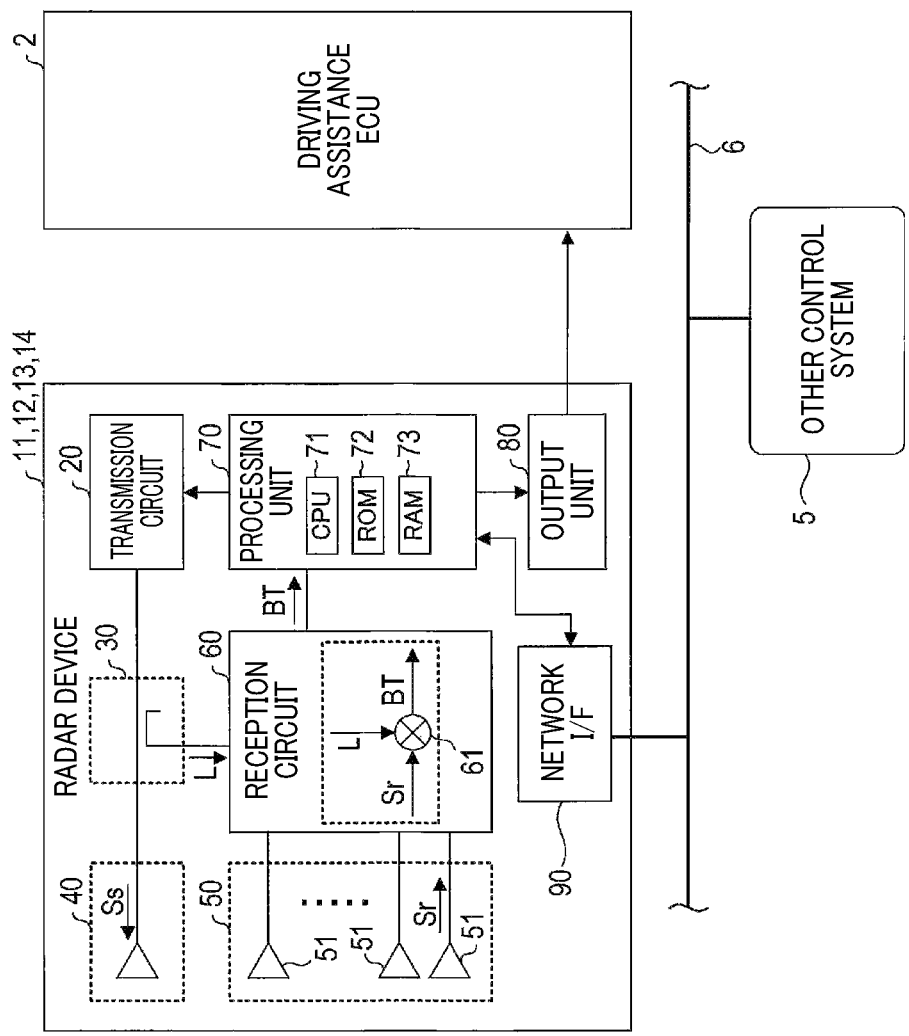
FIG. 2 is a block diagram illustrating the configuration of a radar device.

As shown in FIG. 2, the radar devices 11, 12, 13, 14 . . . repeatedly emit radar waves and receive reflected waves every time a processing cycle elapses, and execute processing to detect the distance D to a target that reflects the radar waves, the relative speed Vr of the target, and the azimuth θ of the target, based on a reception signal Sr.

The radar devices 11, 12, 13, 14 . . . generate driving assistance information for assisting the driving of the vehicle by the driver based on the detected observation values (D, Vr, and θ), and output the driving assistance information to the driving assistance ECU 2.

The driving assistance ECU 2 executes various types of processing for assisting the driving of the vehicle by the driver based on the driving assistance information input from the radar devices 11, 12, 13, 14 . . . . The processing related to driving assistance may include, for example, processing to alert the driver that there is an approaching object, and processing to execute vehicle control to avoid collision with the approaching object by controlling the brake system, steering system, etc., or to automatically change the lane.

The radar devices 11, 12, 13, 14 . . . each comprise a transmission circuit 20, a distributor 30, a transmission antenna 40, a reception antenna 50, a reception circuit 60, a processing unit 70, an output unit 80, and a network interface (hereinafter, "network I/F") 90.

The transmission circuit 20 is a circuit for supplying a transmission signal Ss to the transmission antenna 40. The transmission circuit 20 outputs a high-frequency signal in the millimeter waveband to the distributor 30 positioned upstream of the transmission antenna 40. Specifically, the transmission circuit 20 alternately repeats an up-modulation section and a down-modulation section with a modulation period Tm, and outputs a high-frequency signal generated in each modulation section to the distributor 30. The transmission circuit 20 generates a high-frequency signal with a frequency that is modulated to increase in the up-modulation section, and a high-frequency signal with a frequency that is modulated to decrease in the down-modulation section.

The distributor 30 distributes the high-frequency signals input from the transmission circuit 20 to a transmission signal Ss and a local signal L.

The transmission antenna 40 emits radar waves with a frequency corresponding to the transmission signal Ss, based on the transmission signal Ss supplied from the distributor 30.

The reception antenna 50 is an antenna for receiving reflected waves, which are radar waves reflected on the target. The reception antenna 50 is configured as a linear array antenna in which a plurality of antenna elements 51 are arranged in a line. The reception signal Sr of the reflected waves by each antenna element 51 is input into the reception circuit 60.

The reception circuit 60 processes the reception signal Sr input from each antenna element 51 configuring the reception antenna 50 to generate a beat signal BT for every antenna element 51, and outputs them. Specifically, the reception circuit 60 mixes a reception signal Sr input from the antenna element 51 for every antenna element 51 and a local signal L input from the distributor 30 using a mixer 61, thereby generating a beat signal BT for every antenna element 51, and outputs them.

Hereinafter, a beat signal BT generated by mixing a reception signal Sr and a transmission signal in the period in which radar waves in the up-modulation section are transmitted is referred to as "up-beat signal." Further, a beat signal BT generated by mixing a reception signal Sr and a transmission signal in the period in which radar waves in the down-modulation section are transmitted is referred to as "down-beat signal."

However, the processes up to the output of the beat signal BT include a process of amplifying the reception signal Sr, a process of removing unnecessary signal components from the beat signal BT, and a process of converting the beat signal BT into digital data. Thus, the reception circuit 60 converts the beat signal BT generated for every antenna element 51 into digital data and outputs them. The output beat signal BT for every antenna element 51 is input in the processing unit 70.

The processing unit 70 is an electronic control device mainly configured with a microcomputer comprising CPU 71, ROM 72, RAM 73, and the like. The various functions of the microcomputer are realized in such a manner that the CPU 71 executes programs stored in a non-transitory tangible storage medium. In this example, the ROM 72 corresponds to the non-transitory tangible storage medium that stores the programs. Further, methods corresponding to the programs are executed by the execution of these programs. Some or all of the functions executed by the CPU 71 may be configured in a hardware manner using one or more ICs etc. The number of microcomputers constituting the processing unit 70 may be one or plural.

The processing unit 70 may also comprise a coprocessor that executes fast Fourier transform (hereinafter, "FFT") processing and the like. FFT is an abbreviation of Fast Fourier Transform.

The network I/F 90 is a communication interface that allows the processing unit 70 to perform data communication with another control system 5 via a network 6. The network 6 in the present embodiment is CAN that is well known as an in-vehicle network. CAN is an abbreviation of Controller Area Network. CAN is a registered trademark.

The other control system 5 includes a plurality of in-vehicle devices (e.g., ECU and sensors) other than the driving assistance ECU 2.

Various types of odometry information are regularly sent from the other control system 5 to the network 6. The processing unit 70 acquires odometry information via the network 6. The odometry information to be acquired includes the speed of the vehicle (hereinafter, "vehicle speed") Vs, the yaw rate ω of the vehicle, the rudder angle α of the vehicle, the turning radius Rs of the vehicle, and the like.

The other control system 5 calculates the vehicle speed Vs, yaw rate ω, and rudder angle α based on detection signals from a vehicle speed sensor, a yaw rate sensor, and a rudder angle sensor, all of which are not shown, and further calculates the turning radius Rs by a predetermined operation method based on the rudder angle α. The processing unit 70 may be configured to calculate the turning radius Rs inside the radar devices 11, 12, 13, 14 . . . based on the rudder angle α acquired via the network 6, in place of acquiring the turning radius Rs via the network 6.

In the thus-configured in-vehicle system 1, the CPUs 71 of the radar devices 11 and 12 execute wall calculation processing.

First, the procedure of the wall calculation processing executed by the CPU 71 of the radar device 11 will be described. The wall calculation processing is repeatedly executed every time the above processing cycle elapses during the operation of the processing unit 70.

Figure 3:
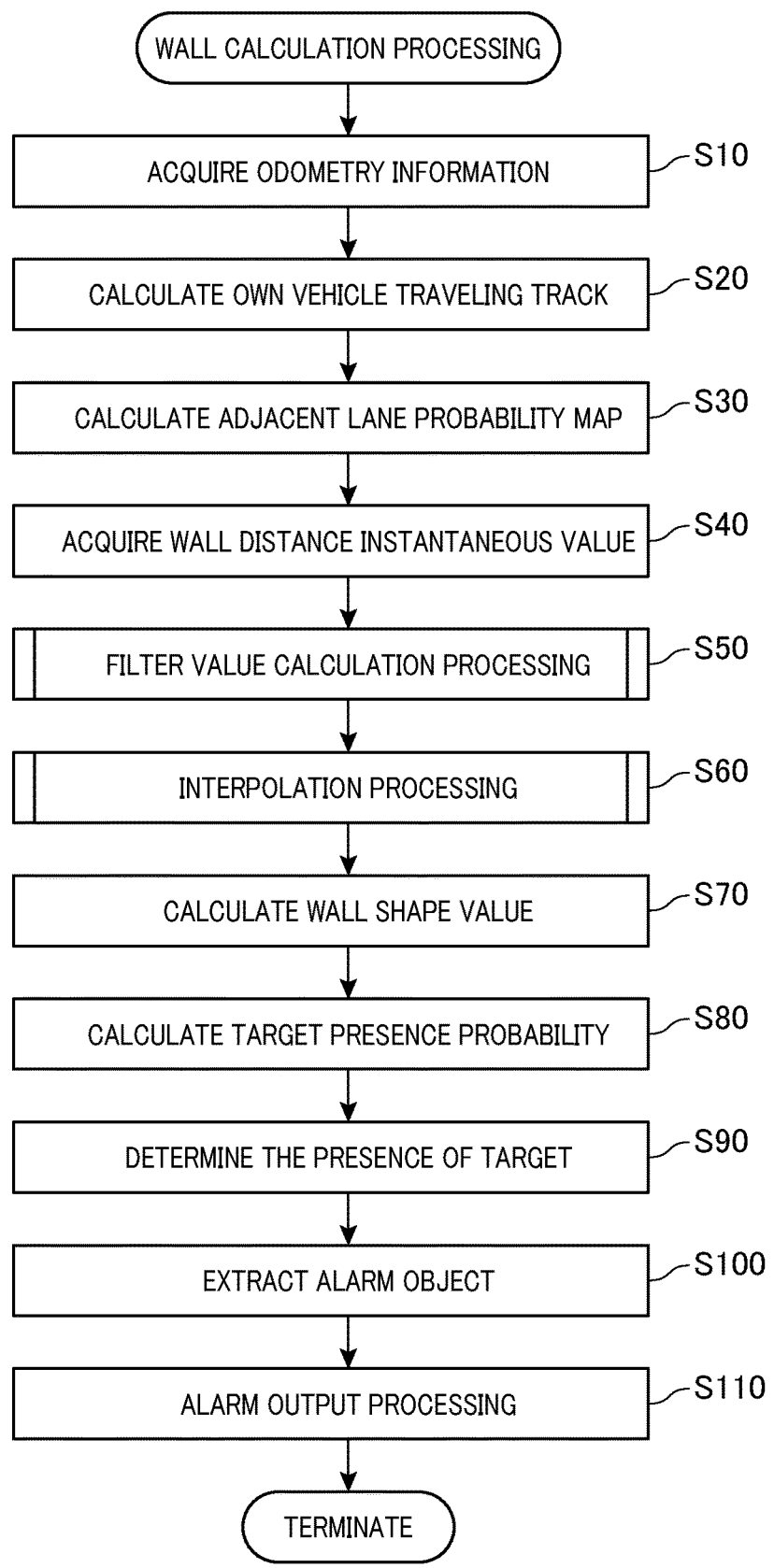
FIG. 3 is a flowchart illustrating wall calculation processing.

When the wall calculation processing is executed, the CPU 71 first acquires odometry information from the other control system 5 via the network 6 in S10, as shown in FIG. 3. The odometry information acquired in S10 includes at least the vehicle speed Vs, yaw rate ω, rudder angle α, and turning radius Rs. The CPU 71 stores, of the odometry information acquired in S10, odometry information until now from N cycles before the above processing cycle in the RAM 73. N is an integer of 2 or more. N is determined in consideration of the distance (e.g., 100 m backward) etc., the own vehicle speed, and the like detected by the own vehicle.

Further, the CPU 71 calculates the traveling track of the own vehicle until now from N cycles before the above processing cycle in S20. Specifically, the CPU 71 calculates the estimated value of the own vehicle position (hereinafter, "estimated own vehicle position") in each processing cycle from 1 cycle before to N cycles before based on the current position using the odometry information (i.e., the value acquired in each processing cycle before N cycles) acquired in S10. Then, the CPU 71 connects the current position and the calculated estimated own vehicle position of each cycle to obtain an own vehicle traveling track. Since the technique of calculating own vehicle traveling tracks from odometry information is well known, the explanation of the details thereof is omitted.

The odometry information acquired in S10 includes errors caused by detection errors of the vehicle speed sensor and yaw rate sensor, noise, and other various factors. Accordingly, the CPU 71 also calculates the estimated presence range of the estimated own vehicle position in consideration of errors in the odometry information, for each estimated own vehicle position in the past processing cycle before N cycles in S20. The estimated presence range can be expressed as the error variance based on the estimated own vehicle position. Further, the error variance can be projected on the lane width direction (i.e., direction perpendicular to the direction of travel), thereby expressing the presence probability of the estimated own vehicle position in the lane width direction as the predetermined probability distribution centered on the estimated own vehicle position.

In the present embodiment, the error variance of the estimated own vehicle position caused by the error factors of the odometry information is modeled as normal distribution. That is, the presence probability in the estimated own vehicle position calculated using the odometry information is the highest probability peak value in the normal distribution. The further away from the estimated own vehicle position in the lane width direction, the lower the presence probability according to the normal distribution.

Then, the CPU 71 calculates an adjacent lane probability map in S30. Specifically, the CPU 71 defines the positions of the adjacent lane (i.e., both end positions in the lane width direction) for each estimated own vehicle position before N cycles. Then, the error variance in the estimated own vehicle position is projected on the defined positions of the adjacent lane to calculate the probability distribution of the adjacent lane.

Specifically, the CPU 71 defines the positions of two lane markers that divide the adjacent lane (i.e. the lane markers on both sides of the adjacent lane), namely an inner estimated marker position (hereinafter, "inner lane marker position") that is an estimated value of the position of a lane marker on the side closer to the own vehicle (hereinafter, "inner lane marker") and an outer estimated marker position (hereinafter, "outer lane marker position") that is an estimated value of the position of a lane marker on the side farther from the own vehicle (hereinafter, "outer lane marker"). Then, the CPU 71 directly projects the error variance of the estimated own vehicle position on each estimated marker position, thereby setting the probability distribution of each marker position in the lane width direction.

That is, as for the inner marker position, the inner estimated marker position is the peak value of the normal distribution. As further away from the inner estimated marker position, the presence probability of the inner marker position decreases according to the normal distribution. As for the outer marker position, the outer estimated marker position is the peak value of the normal distribution. As further away from the outer estimated marker position, the presence probability of the outer marker position decreases according to the normal distribution.

Then, the CPU 71 connects points where the presence probability of the inner marker position is equal (e.g., points of predetermined probabilities P1, P2, and P3) in each processing cycle before N cycles, and connects points where the presence probability of the outer marker position is equal (e.g., as with the inner side, points of predetermined probabilities P1, P2, and P3), thereby calculating an adjacent lane probability map. The adjacent lane probability map shows regions where the probabilities that there is an adjacent lane are P1, P2, and P3. In other words, it can also be said that this map indicates that when there is a target in the region shown in the adjacent lane probability map, the probabilities that the target is present in the adjacent lane are P1, P2, and P3.

In the present embodiment, the probabilities P1, P2, and P3 are 100, 70, and 30%, respectively. A map indicating the region of the probability P1 is formed by a line connecting points $1\sigma$ (i.e., 68.3%). A map indicating the region of the probability P2 is formed by a line connecting points $2\sigma$ (i.e., 95.5%). A map indicating the region of the probability P3 is formed by a line connecting points $3\sigma$ (i.e., 99.7%).

Next, the CPU 71 acquires a wall distance instantaneous value in S40. Specifically, the CPU 71 first extracts a plurality of peaks (in the present embodiment, three peaks in descending order of power) within the range of peak extraction frequency for each of the power spectra of up-beat and down-beat signals, and performs azimuth development processing (e.g., MUSIC, DBF, and CAPON).

The power spectrum is calculated by executing frequency analysis processing (e.g., FFT processing) on each of the up-beat and down-beat signals. In the power spectrum, the power of the beat signal is expressed for each frequency bin. The frequency bin is the frequency range as the unit scale of the power spectrum. The power spectrum is obtained for each of the plurality of antenna elements 51. The power spectrum from which peaks are to be extracted in S40 is the average of the power spectra obtained from the respective antenna elements 51.

Further, the CPU 71 extracts an azimuth peak from the azimuth development spectrum, and performs pair matching on a plurality of up and down azimuth peaks in consideration of the features of the wall. Then, the CPU 71 determines that the wall is detected when pair matching is established, and that the wall cannot be detected when pair matching is not established.

The CPU 71 determines that pair matching is established when all of the following first pair matching determination condition, second pair matching determination condition, and third pair matching determination condition are satisfied.

The first pair matching determination condition is such that the up and down frequencies substantially match with each other. The first pair matching determination condition is set based on the fact that the wall right next to the vehicle does not have a relative speed with respect to the own vehicle.

The second pair matching determination condition is such that the up and down azimuths substantially match with each other. The second pair matching determination condition is set based on the fact that both up and down azimuths detect the wall in the horizontal direction.

The third pair matching determination condition is such that the up and down powers substantially match with each other. The third pair matching determination condition is set based on the fact that the powers of reception signals Sr reflected from the same target basically match with each other.

In response to the wall being detected, the CPU 71 acquires the distance D calculated from the peak pair for which pair matching is established, as the wall distance instantaneous value.

Then, the CPU 71 executes filter value calculation processing in S50.

Next, the procedure of the filter value calculation processing will be described.

Figure 4:
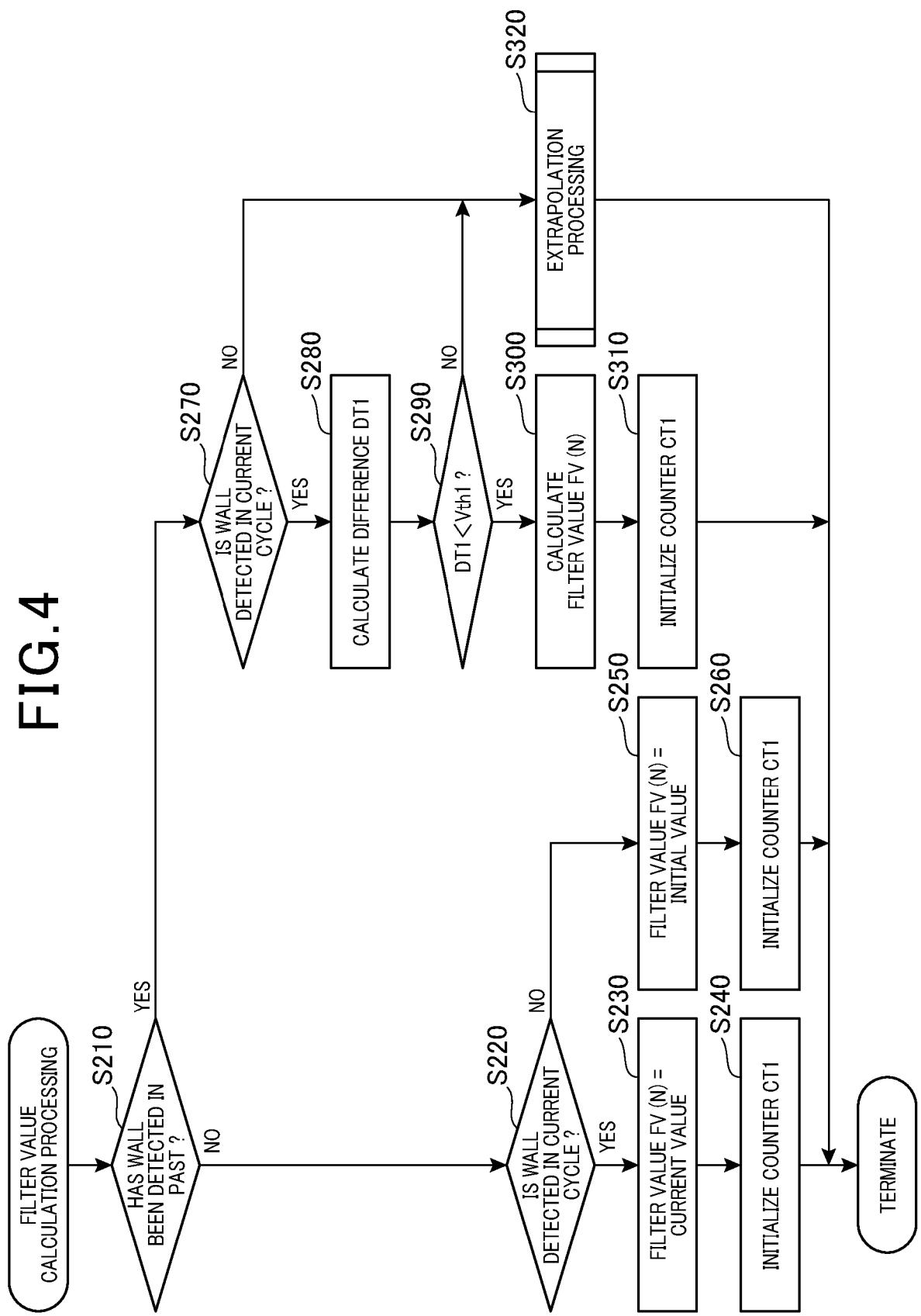
FIG. 4 is a flowchart illustrating filter value calculation processing.

When the filter value calculation processing is executed, the CPU 71 first determines whether a right-side wall has been detected in the past in S210, as shown in FIG. 4. The past in S210 refers to a period of time from the latest activation of the processing unit 70 to the current time.

When the right-side wall has not been detected in the past, the CPU 71 determines whether the right-side wall is detected in the current cycle in S220. When the right-side wall is detected in the current processing cycle, the CPU 71 updates wall filter values FV (N), FV (N−1), FV (N−2), ..., FV (1), and FV (0) provided in the RAM 73 in S230. Specifically, the CPU 71 first stores the wall filter values FV (N), FV (N−1), ..., FV (1) in the wall filter values FV (N−1), FV (N−2), ..., FV (0), respectively. Next, the CPU 71 stores the wall distance instantaneous value (hereinafter, "current value") acquired in S40 in the wall filter value FV (N).

Then, the CPU 71 initializes an extrapolation counter CT1 (i.e., sets CT1 to be 0) provided in the RAM 73 in S240, and terminates the filter value calculation processing.

When the right-side wall is not detected in the current processing cycle in S220, the CPU 71 updates the wall filter values FV (N), FV (N−1), FV (N−2), ..., FV (1), and FV (0) in S250. Specifically, the CPU 71 first stores the wall filter values FV (N), FV (N−1), ..., FV (1) in the wall filter values FV (N−1), FV (N−2), ..., FV (0), respectively. Next, the CPU 71 stores a preset initial value in the wall filter value FV (N). In the present embodiment, the initial value is set as a value corresponding to 15 m.

Then, the CPU 71 initializes the extrapolation counter CT1 in S260, and terminates the filter value calculation processing.

Further, when the right-side wall has been detected in the past in S210, the CPU 71 determines whether the right-side wall is detected in the current processing cycle in S270. When the right-side wall is not detected in the current processing cycle, the CPU 71 moves to S320. On the other hand, when the right-side wall is detected in the current processing cycle, the CPU 71 calculates a difference DT1 in S280. Specifically, when extrapolation processing, described later, is not executed in the previous processing cycle, the CPU 71 stores a value indicating the difference between the value stored in the wall filter value FV (N) (i.e., the wall filter value in the previous cycle) and the current value in the difference DT1 provided in the RAM 73. On the other hand, when extrapolation processing is executed in the previous cycle, the CPU 71 stores a value indicating the difference between the wall filter value immediately before the extrapolation processing is started and the current value in the difference DT1.

Then, the CPU 71 determines whether the value stored in the difference DT1 is less than a preset first threshold value Vth1 in S290.

When the value stored in the difference DT1 is less than the first threshold value Vth1, the CPU 71 updates the wall filter values FV (N), FV (N−1), FV (N−2), . . . , FV (1), and FV (0) in S300. Specifically, the CPU 71 first stores the wall filter values FV (N), FV (N−1), . . . , FV (1) in the wall filter values FV (N−1), FV (N−2), . . . , FV (0), respectively. Next, the CPU 71 stores a value calculated from the right-hand side of formula (1) in the wall filter value FV (N). TV1 in formula (1) is the current value.

$$FV(N)=TV1\times 0.3+FV(N-1)\times 0.7 \quad (1)$$

Then, the CPU 71 initializes the extrapolation counter CT1 in S310, and terminates the filter value calculation processing.

When the value stored in the difference DT1 is equal to or more than the first threshold value Vth1 in S290, the CPU 71 moves to S320.

Moving to S320, the CPU 71 executes extrapolation processing and terminates the filter value calculation processing.

Next, the procedure of the extrapolation processing will be described.

Figure 5:
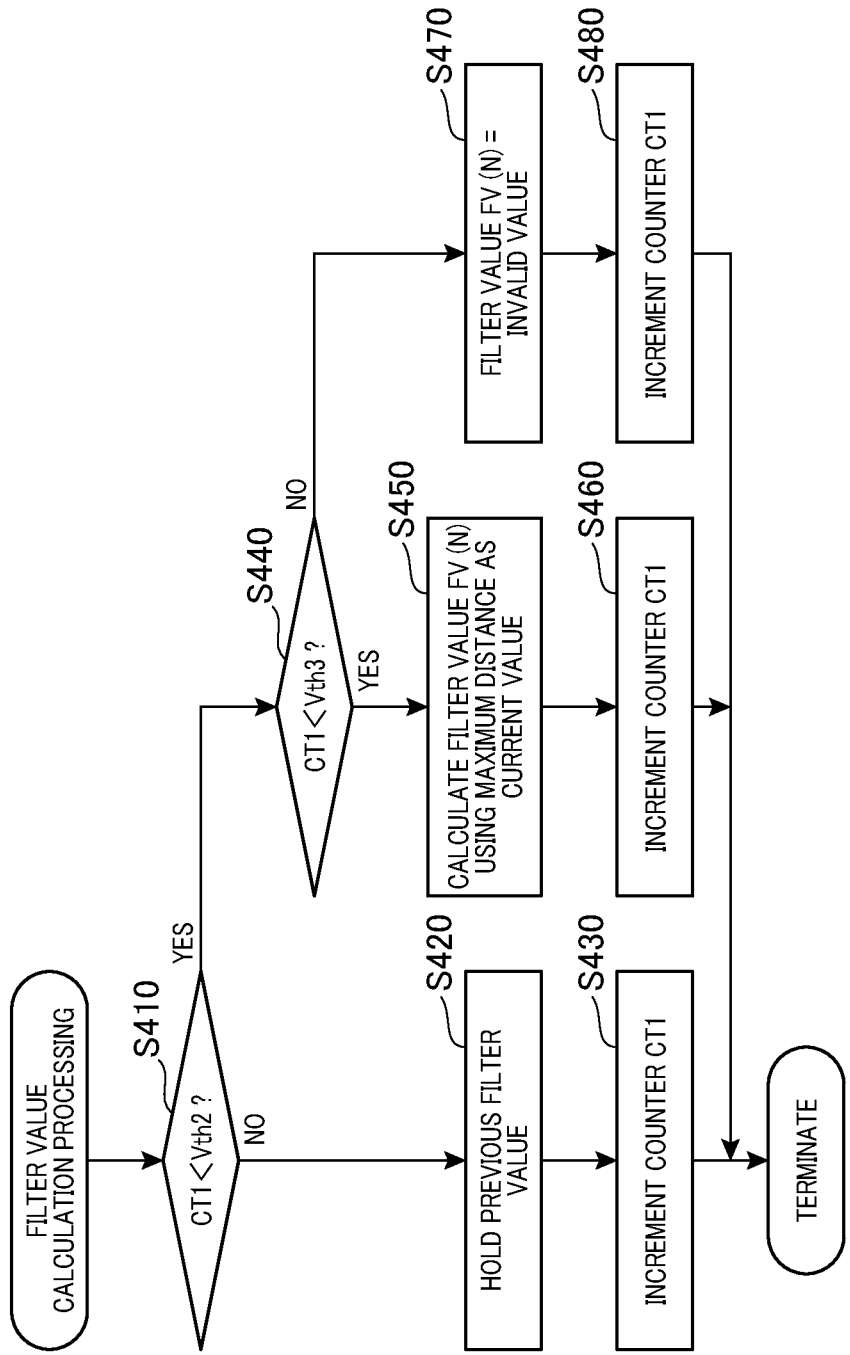
FIG. 5 is a flowchart illustrating extrapolation processing.

When the extrapolation processing is executed, the CPU 71 first determines whether the value of the extrapolation counter CT1 is less than a preset second threshold value Vth2 in S410, as shown in FIG. 5. In the present embodiment, the second threshold value Vth2 is set to be 10.

When the value of the extrapolation counter CT1 is less than the second threshold value Vth2, the CPU 71 updates the wall filter values FV (N), FV (N−1), FV (N−2), . . . , FV (1), and FV (0) in S420. Specifically, the CPU 71 first stores the wall filter values FV (N), FV (N−1), . . . , FV (1) in the wall filter values FV (N−1), FV (N−2), . . . , FV (0), respectively. Next, the CPU 71 stores the wall filter value FV (N−1) in the wall filter value FV (N).

Then, the CPU 71 increments (i.e., adds 1 to) the extrapolation counter CT1 in S430, and terminates the extrapolation processing.

When the value of the extrapolation counter CT1 is equal to or more than the second threshold value Vth2 in S410, the CPU 71 determines whether the value of the extrapolation counter CT1 is less than a preset third threshold value Vth3 in S440. In the present embodiment, the third threshold value Vth3 is set to be 30.

When the value of the extrapolation counter CT1 is less than the third threshold value Vth3, the CPU 71 updates the wall filter values FV (N), FV (N−1), FV (N−2), . . . , FV (1), and FV (0) in S450. Specifically, the CPU 71 first stores the wall filter values FV (N), FV (N−1), . . . , FV (1) in the wall filter values FV (N−1), FV (N−2), . . . , FV (0), respectively. Next, the CPU 71 stores a value calculated from the right-hand side of formula (2) in the wall filter value FV (N). MD in formula (2) is a preset maximum distance. In the present embodiment, the maximum distance MD is set as a value corresponding to 15 m. That is, the CPU 71 calculates the wall filter value FV (N) using the maximum distance MD as the current value TV1 in formula (1).

$$FV(N)=MD\times 0.3+FV(N-1)\times 0.7 \quad (2)$$

Then, the CPU 71 increments the extrapolation counter CT1 in S460, and terminates the extrapolation processing.

Moreover, when the value of the extrapolation counter CT1 is equal to or more than the third threshold value Vth3 in S440, the CPU 71 updates the wall filter values FV (N), FV (N−1), FV (N−2), . . . , FV (1), and FV (0) in S470. Specifically, the CPU 71 first stores the wall filter values FV (N), FV (N−1), . . . , FV (1) in the wall filter values FV (N−1), FV (N−2), . . . , FV (0), respectively. Next, the CPU 71 stores a preset invalid value in the wall filter value FV (N). In the present embodiment, the invalid value is set as a value corresponding to 100 m.

Then, the CPU 71 increments the extrapolation counter CT1 in S480, and terminates the extrapolation processing.

When the filter value calculation processing is terminated, the CPU 71 executes interpolation processing in S60, as shown in FIG. 3.

Next, the procedure of the interpolation processing will be described.

Figure 6:
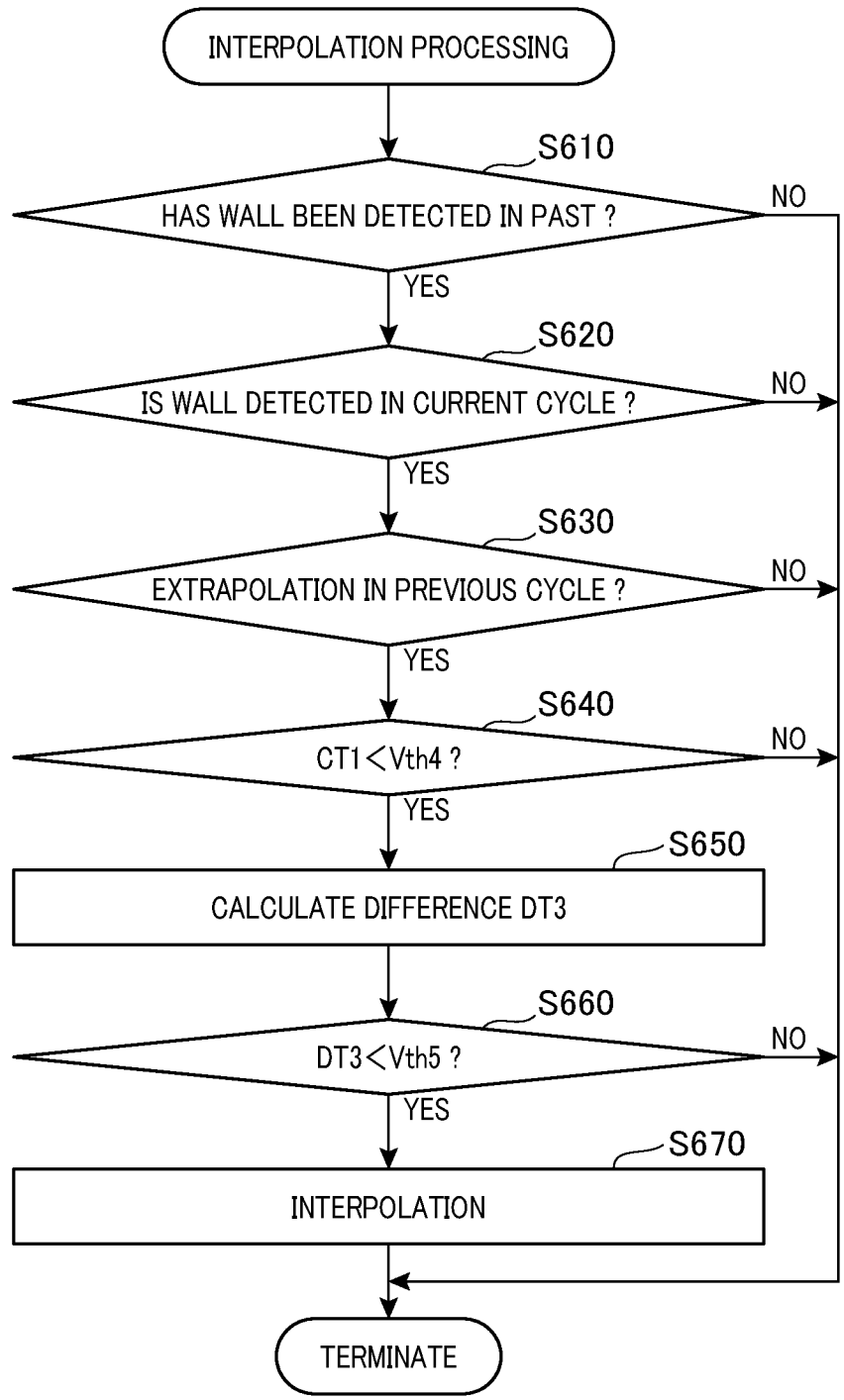
FIG. 6 is a flowchart illustrating the interpolation processing of a first embodiment.

When the interpolation processing is executed, the CPU 71 first determines whether the right-side wall has been detected in the past in S610, as shown in FIG. 6.

When the right-side wall has not been detected in the past, the CPU 71 terminates the interpolation processing. On the other hand, when the right-side wall has been detected in the past, the CPU 71 determines whether the right-side wall is detected in the current processing cycle in S620.

When the right-side wall is not detected in the current processing cycle, the CPU 71 terminates the interpolation processing. On the other hand, when the right-side wall is detected in the current processing cycle, the CPU 71 determines whether extrapolation processing is executed in the previous processing cycle in S630.

When extrapolation processing is not executed in the previous processing cycle, the CPU 71 terminates the interpolation processing. On the other hand, when extrapolation processing is executed in the previous processing cycle, the CPU 71 determines whether the value of the extrapolation counter CT1 is less than a preset fourth threshold value Vth4 in S640. In the present embodiment, the fourth threshold value Vth4 is set to be 40.

When the value of the extrapolation counter CT1 is equal to or more than the fourth threshold value Vth4, the CPU 71 terminates the interpolation processing. On the other hand, when the value of the extrapolation counter CT1 is less than the fourth threshold value Vth4, the CPU 71 calculates a difference DT3 in S650. Specifically, the CPU 71 stores a value indicating the difference between the wall filter value immediately before the latest extrapolation processing is started and the current value in the difference DT3 provided in the RAM 73.

Then, the CPU 71 determines whether the value stored in the difference DT3 is less than a preset fifth threshold value Vth5 in S660. In the present embodiment, the fifth threshold value Vth5 is set as a value corresponding to 1 m.

When the value stored in the difference DT3 is equal to or more than the fifth threshold value Vth5, the CPU 71 terminates the interpolation processing. On the other hand, when the value stored in the difference DT3 is less than the fifth threshold value Vth5, the CPU 71 interpolates the wall filter value in the extrapolation period in S670, and terminates the interpolation processing. Specifically, the CPU 71 calculates the wall filter value in the extrapolation period, for example, by linear interpolation using the wall filter value immediately before the latest extrapolation processing is started and the wall filter value FV (N).

Figure 7:
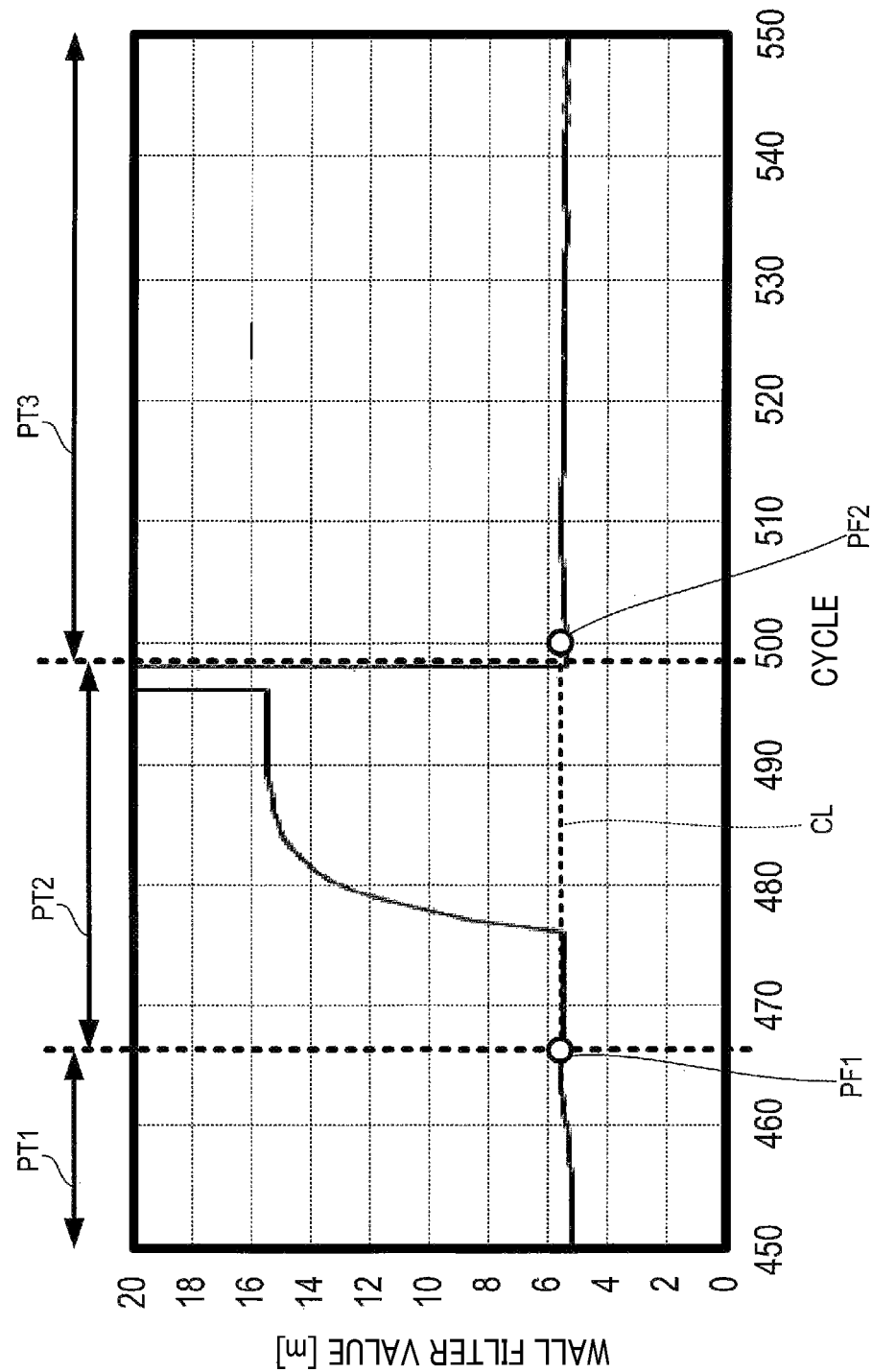
FIG. 7 is a view illustrating an interpolation method.

For example, as shown in FIG. 7, the period PT1 is a period of time in which the wall is detected, and the wall filter value varies between 5 m and 6 m. The period PT2 is a period of time in which extrapolation processing is performed, and the wall filter value holds the previous value in the first 10 cycles. After 10 cycles, the wall filter value gradually approaches the maximum distance (i.e. 15 m). Further, after 30 cycles, the wall filter value becomes an invalid value. The period PT3 is a period of time in which the wall is detected, and the wall filter value varies around 6 m.

As shown by the interpolation straight line CL, the interpolation processing calculates the wall filter value in the extrapolation period by connecting, with a straight line, a wall filter value PF1 immediately before extrapolation processing is performed and a wall filter value PF2 immediately after the extrapolation processing is terminated.

Figure 8:
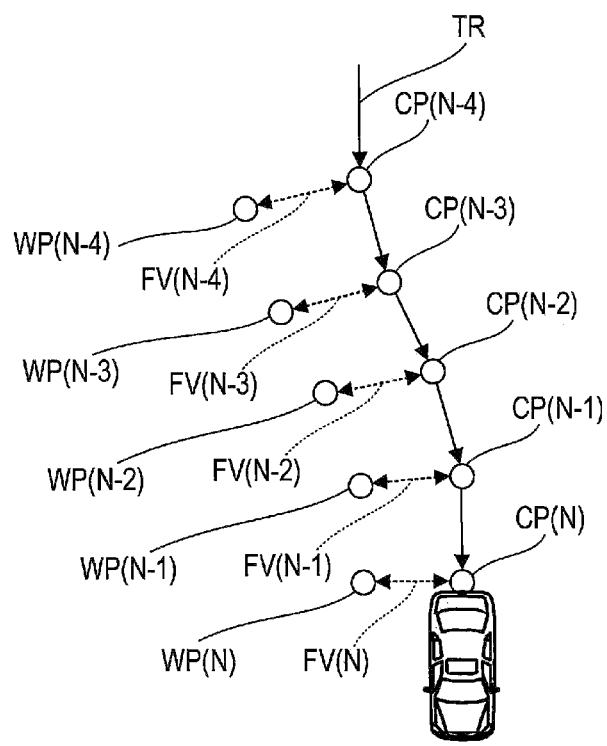
FIG. 8 is a view illustrating a method for calculating the wall shape.

Then, when the interpolation processing is terminated, the CPU 71 calculates the wall shape value in S70, as shown in FIG. 3. Specifically, the CPU 71 uses, as shown in FIG. 8, as a starting point, each of the estimated own vehicle positions CP (N), CP (N−1), CP (N−2), ..., CP (1), and CP (0) that configure the traveling track TR of the own vehicle from now to before N cycles, and sets positions away to the right side along the horizontal direction orthogonal to the straight traveling direction by the wall filter values FV (N), FV (N−1), FV (N−2), ..., FV (1), and FV (0), as wall positions WP (N), WP (N−1), WP1 (N−2), ..., WP (1), and WP (0). The wall positions WP (N) to WP1 (0) are wall shape values.

Then, when the processing of S70 is terminated, the CPU 71 calculates the presence probability of the target in the adjacent lane in S80, as shown in FIG. 3. Specifically, the CPU 71 adds the wall shape values calculated in S70 to the adjacent lane probability map calculated in S30 to calculate the target presence probability distribution. That is, the CPU 71 basically calculates the target presence probability according to the adjacent lane probability map. However, if there is a wall, the CPU 71 sets the adjacent lane presence probability uniformly to 0 for a region outside the wall in the adjacent lane probability map, and sets the presence probability of the target to 0 for that region. Alternatively, the CPU 71 may delete targets detected outside the wall.

Further, the CPU 71 determines the presence of the target in the adjacent lane in S90. Specifically, the CPU 71 determines whether the target is present in the adjacent lane based on the target presence probability calculated in S80 and the position information of the detected target. The adjacent lane presence probability of the target is not calculated by using only the value in the current cycle; the final adjacent lane presence probability is calculated by using a filter value obtained by multiplying the past adjacent lane presence probability by the forgetting coefficient.

For example, when the filter value of the target presence probability is 70% or more, the CPU 71 determines that the target is present in the adjacent lane. Conversely, when the filter value of the target presence probability is less than 70%, the CPU 71 determines that the target is not present in the adjacent lane.

Next, the CPU 71 extracts an alarm object in S100. Specifically, when it is determined in S90 that the target is present in the adjacent lane, the CPU 71 confirms the positional relationship between the target and the own vehicle. Then, when their positional relationship satisfies a predetermined condition, the CPU 71 extracts the target as an alarm object. The predetermined condition is such that, for example, at least one of the following first extraction condition and second extraction condition is satisfied. The first extraction condition is such that the distance between the own vehicle and the target (hereinafter, "relative distance") is equal to or less than a predetermined distance. The second extraction condition is such that the time to arrive at the own vehicle estimated from the relative speed detected in the radar device is equal to or less than a predetermined time.

Then, the CPU 71 executes alarm output processing in S110, and terminates the wall calculation processing. Specifically, when the alarm object is extracted in S100, the CPU 71 outputs an alarm instruction, which instructs the output of an alarm indicating the presence of the alarm object, to the driving assistance ECU 2. Upon acquisition of the alarm instruction, the driving assistance ECU 2 allows the alarm device 4 to output an alarm with the content indicated by the alarm instruction.

The wall calculation processing executed by the CPU 71 of the radar device 12 is the same as the wall calculation processing executed by the CPU 71 of the radar device 11, except that the former targets a left-side wall. For this reason, the explanation of the procedure of the wall calculation processing executed by the CPU 71 of the radar device 12 is omitted.

The line WF1 of the graph GR1 shown in FIG. 9 denotes the wall shape when extrapolation processing is not performed when false wall detection occurs. In the area surrounded by the ellipse EL1, the wall shape is calculated to be closer to the own vehicle.

On the other hand, the line WF2 of the graph GR2 shown in FIG. 9 denotes the wall shape when extrapolation processing is performed when false wall detection similar to that of the graph GR1 occurs. In the area surrounded by the ellipse EL2 located in the same position as the ellipse EL1, the wall shape is improved.

The line WF3 of the graph GR3 shown in FIG. 9 denotes the wall shape when extrapolation processing is not performed when false wall detection different from that of the graph GR1 occurs. In the area surrounded by the ellipse EL3, the wall shape is calculated to be closer to the own vehicle.

On the other hand, the line WF4 of the graph GR4 shown in FIG. 9 denotes the wall shape when extrapolation processing is performed when false wall detection similar to that of the graph GR3 occurs. In the area surrounded by the ellipse EL4 located in the same position as the ellipse EL3, the wall shape is not calculated to be closer to the own vehicle, and the wall shape is improved. However, the wall shape is calculated to be outside the actual wall.

Figure 10:
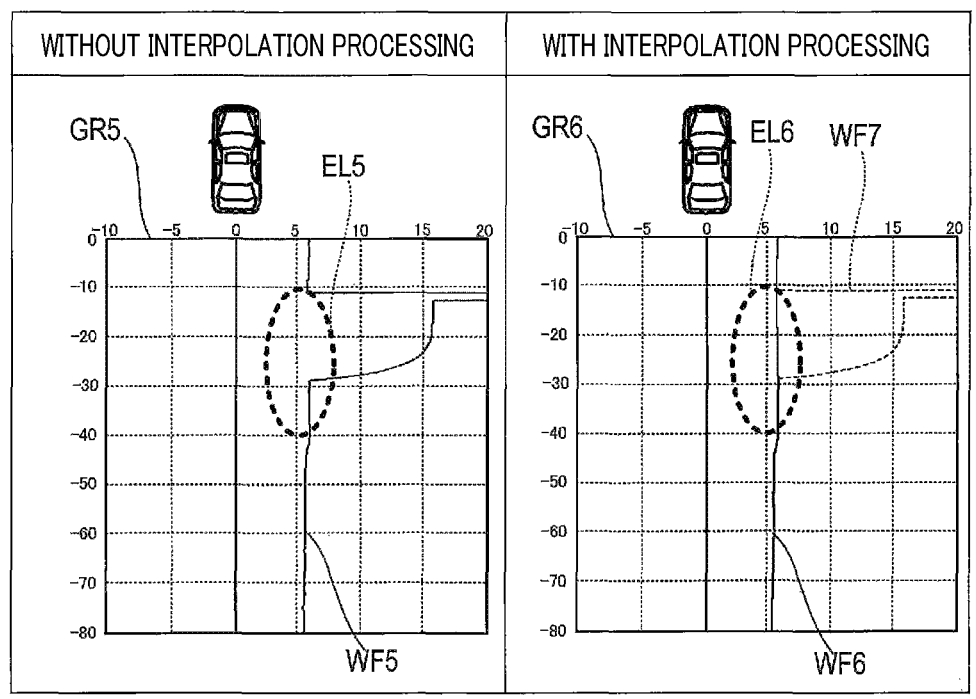
FIG. 10 is a view illustrating the difference in the wall shape due to the presence of interpolation processing.

The graph GR5 shown in FIG. 10 is the same as the graph GR4 shown in FIG. 9. That is, the line WF5 of the graph GR5 shown in FIG. 10 denotes the wall shape when extrapolation processing is performed and interpolation processing is not performed when false wall detection similar to that of the graph GR3 occurs. In the area surrounded by the ellipse EL5, the wall shape is calculated to be outside the actual wall.

On the other hand, the line WF6 of the graph GR6 shown in FIG. 10 denotes the wall shape when interpolation processing is performed when false wall detection similar to that of the graph GR5 occurs. The broken line WF7 of the graph GR6 is the same as the line WF5 of the graph GR5. In the area surrounded by the ellipse EL6 located in the same position as the ellipse EL5, the wall shape is not calculated to be closer to the own vehicle, and is not calculated to be outside the actual wall. That is, the wall shape is calculated to be in the vicinity of the actual position of the wall, and the wall shape is improved.

The thus-configured radar devices 11 and 12 repeatedly determine whether a wall installed along the road on which the vehicle is traveling is detected, using a reception signal Sr obtained by receiving radar waves transmitted and reflected in the preset detection region around the own vehicle. Then, in response to the wall being detected, the radar devices 11 and 12 acquire a wall distance instantaneous value indicating the distance to the wall using the reception signal Sr.

The radar devices 11 and 12 calculate a plurality of wall shape values indicating the positions of a plurality of locations on the surface of the wall using the traveling track of the vehicle and a plurality of repeatedly acquired past wall distance instantaneous values.

The radar devices 11 and 12 determine whether the acquired wall distance instantaneous value is suddenly changed, based on a preset sudden change determination condition. The sudden change determination condition is such that the difference DT1 is less than the first threshold value Vth1, and such that the difference DT2 is less than the first threshold value Vth1.

In response to the wall distance instantaneous value being suddenly changed, the radar devices 11 and 12 extrapolate wall shape values after it is determined that the wall distance instantaneous value is suddenly changed.

Thus, when the wall distance instantaneous value is suddenly changed, the radar devices 11 and 12 extrapolate wall shape values after the wall distance instantaneous value is suddenly changed. Therefore, for example, when a situation where there is no other vehicle between the own vehicle and the wall is changed to a situation where there is another vehicle between the own vehicle and the wall, the wall distance instantaneous value is suddenly changed, and the radar devices 11 and 12 calculate wall shape values after the wall distance value is suddenly changed, based on the wall shape value before the wall distance instantaneous value is suddenly changed. As a result, the radar devices 11 and 12 can suppress the wall shape from being calculated to be closer to the own vehicle than to the actual position of the wall.

The radar devices 11 and 12 calculate wall filter values by performing filter processing on the wall distance instantaneous values, and further calculate a plurality of wall shape values using the traveling track and the wall filter values. Then, when the number of extrapolations (i.e., the value of the extrapolation counter CT1) is less than the preset second threshold value Vth2, the driving assistance ECU 2 extrapolates a wall shape value by holding the current wall filter value in the previous wall filter value. As a result, the radar devices 11 and 12 can suppress the wall shape from being calculated to be closer to the own vehicle than to the actual position of the wall.

When the number of extrapolations is less than the third threshold value Vth3, which is set to be more than the second threshold value Vth2, the radar devices 11 and 12 extrapolate a wall shape value by making the wall filter value close to the preset maximum distance MD. As a result, the radar devices 11 and 12 can suppress the wall shape from being calculated to be closer to the own vehicle than to the actual position of the wall.

When the number of extrapolations is equal to or more than the third threshold value Vth3, the radar devices 11 and 12 extrapolate a wall shape value by setting the wall filter value as an invalid value that is set to be more than the maximum distance MD. As a result, the radar devices 11 and 12 can use the wall shape value to indicate that the calculation result of the wall shape is invalid.

The sudden change determination condition when no extrapolation is performed is such that the difference between the current wall distance instantaneous value and the previous wall filter value is equal to or more than the first threshold value Vth1. Further, the sudden change determination condition when extrapolation is performed is such that the difference between the current wall distance instantaneous value and the wall filter value immediately before extrapolation is executed is equal to or more than the first threshold value Vth1.

The radar devices 11 and 12 determine whether a wall is detected. The radar devices 11 and 12 determine that the wall is detected when the difference between the current wall distance instantaneous value and the wall filter value immediately before extrapolation is executed is less than the preset fifth threshold value Vth5. Then, in response to the wall being detected, and when the extrapolation period in which extrapolation is executed (i.e., the value of the extrapolation counter CT1) is less than the preset fourth threshold value Vth4, the driving assistance ECU 2 interpolates a plurality of wall shape values in the extrapolation period. As a result, the radar devices 11 and 12 can suppress the wall shape from significantly differing from the actual position of the wall.

In the embodiment described above, the radar devices 11 and 12 correspond to the wall shape measurement device, S40 corresponds to the processing as the wall distance acquisition part, and S10, S20, S50, and S70 correspond to the processing as the wall shape calculation part.

S280 and S290 correspond to the processing as the sudden change determination part, and S320 corresponds to the processing as the extrapolation part.

Further, the right-side wall and left-side wall correspond to the wall-like objects, the wall distance instantaneous value corresponds to the wall distance value, and the wall filter value FV corresponds to the wall distance filter value.

Moreover, the value of the extrapolation counter CT1 corresponds to the number of extrapolations, the second threshold value Vth2 corresponds to the holding determination value, the third threshold value Vth3 corresponds to the maximum determination value, the maximum distance MD corresponds to the maximum value, and the first threshold value Vth1 corresponds to the sudden change determination value.

In addition, S650 and S660 correspond to the processing as the wall detection determination part, S640 and S670 correspond to the processing as the period interpolation part, the value of the extrapolation counter CT1 corresponds to the extrapolation period, the fourth threshold value Vth4 corresponds to the interpolation determination time, and the fifth threshold value Vth5 corresponds to the wall detection determination value.

Second Embodiment

The second embodiment of the present disclosure will be described below with reference to the drawings. In the second embodiment, the difference from the first embodiment will be described. The same signs are assigned to the common configurations.

The in-vehicle system 1 of the second embodiment is different from that of the first embodiment in that the interpolation processing is changed.

Figure 11:
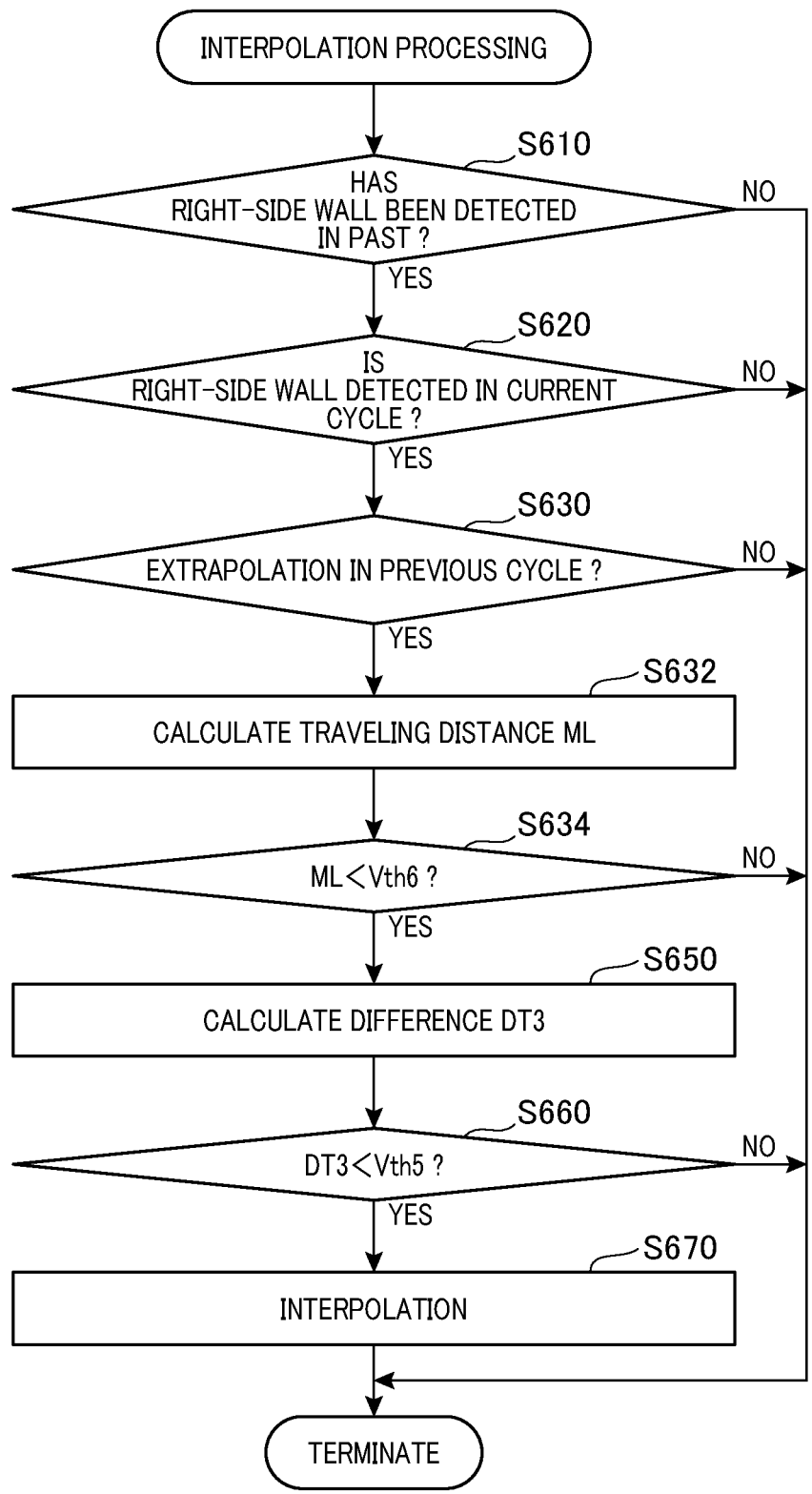
FIG. 11 is a flowchart illustrating the interpolation processing of a second embodiment.

The interpolation processing of the second embodiment is different from that of the first embodiment in that S640 is omitted while S632 and S634 are added, as shown in FIG. 11.

That is, when extrapolation processing is executed in the previous processing cycle in S630, the CPU 71 calculates the traveling distance ML in the extrapolation period in S632. Specifically, the CPU 71 confirms the extrapolation start timing at which extrapolation processing is started, based on the value of the extrapolation counter CT1. Further, the CPU 71 traces the traveling track TR from the estimated own vehicle position at the extrapolation start timing to the estimated own vehicle position at the current time CP (N), and calculates the tracing distance. Then, the CPU 71 stores a value indicating the calculated distance in the traveling distance ML provided in the RAM 73.

Next, the CPU 71 determines whether the value stored in the traveling distance ML is less than a preset sixth threshold value Vth6 in S634. When the value stored in the traveling distance ML is equal to or more than the sixth threshold value Vth6, the CPU 71 terminates the extrapolation processing. On the other hand, when the value stored in the traveling distance ML is less than the sixth threshold value Vth6, the CPU 71 moves to S650.

The thus-configured radar devices 11 and 12 determine whether a wall is detected. Then, in response to the wall being detected and when the traveling distance ML of the own vehicle in the extrapolation period is less than the preset sixth threshold value Vth6, the radar devices 11 and 12 interpolate a plurality of wall shape values in the extrapolation period. As a result, the radar devices 11 and 12 can suppress the wall shape from significantly differing from the actual position of the wall.

In the embodiment described above, S632, S634, and S670 correspond to the processing as the distance interpolation part, and the sixth threshold value Vth6 corresponds to the interpolation determination distance.

Third Embodiment

The third embodiment of the present disclosure will be described below with reference to the drawings. In the third embodiment, the difference from the second embodiment will be described. The same signs are assigned to the common configurations.

The in-vehicle system 1 of the third embodiment is different from that of the second embodiment in that the interpolation processing is changed.

Figure 12:
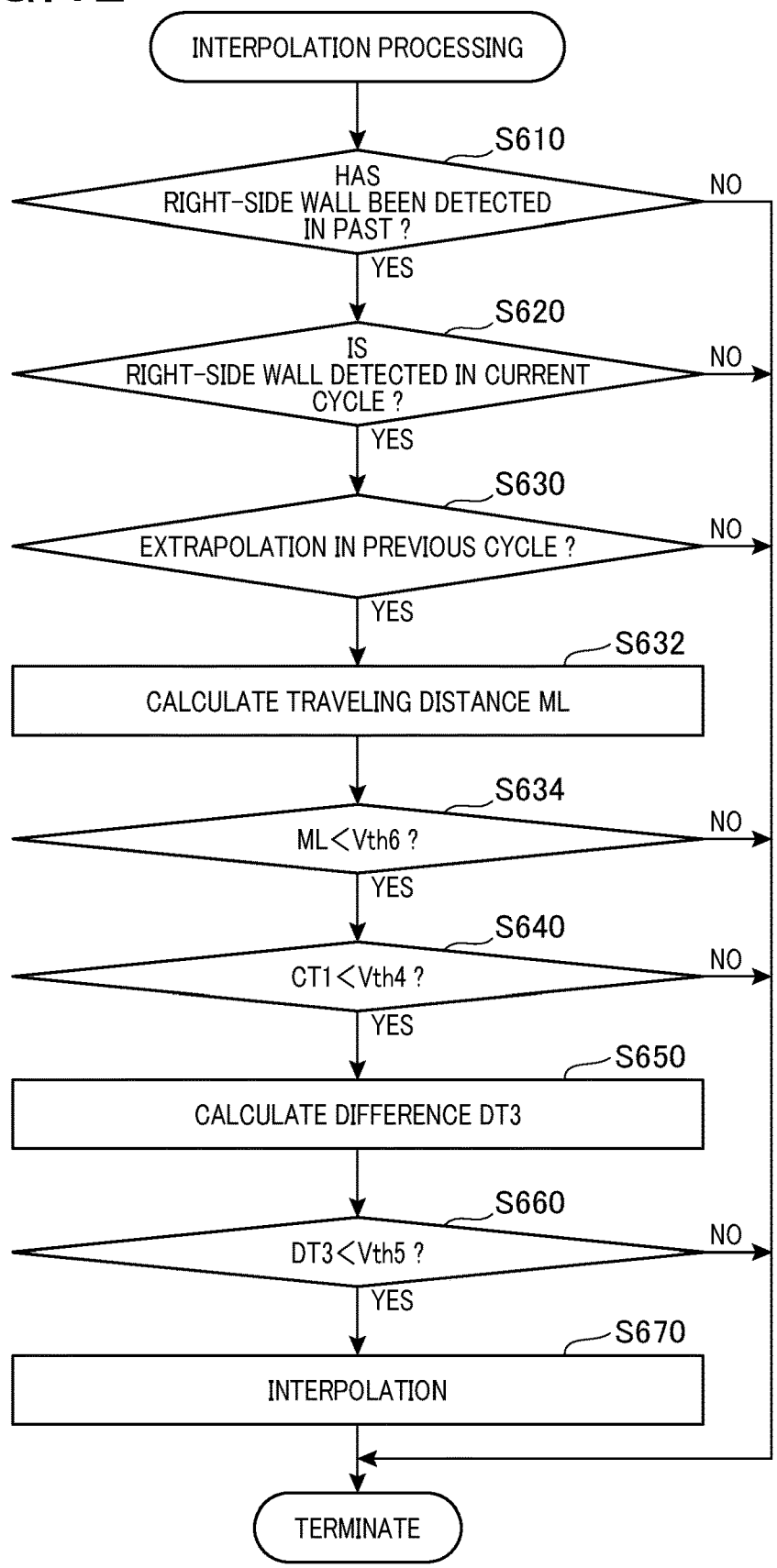
FIG. 12 is a flowchart illustrating the interpolation processing of a third embodiment.

The interpolation processing of the third embodiment is different from that of the second embodiment in that S640 is added, as shown in FIG. 12.

That is, when the value stored in the traveling distance ML is less than the sixth threshold value Vth6 in S634, the CPU 71 moves to S640.

Moving to S640, the CPU 71 determines whether the value of the extrapolation counter CT1 is less than the fourth threshold value Vth4. When the value of the extrapolation counter CT1 is equal to or more than the fourth threshold value Vth4, the CPU 71 terminates the interpolation processing. On the other hand, when the value of the extrapolation counter CT1 is less than the fourth threshold value Vth4, the process moves to S650.

The thus-configured radar devices 11 and 12 determine whether a wall is detected. Then, in response to the wall being detected, when the extrapolation period is less than the preset fourth threshold value Vth4, and when the traveling distance ML of the own vehicle in the extrapolation period is less than the preset sixth threshold value Vth6, the radar devices 11 and 12 interpolate a plurality of wall shape values in the extrapolation period. As a result, the radar devices 11 and 12 can suppress the wall shape from significantly differing from the actual position of the wall.

In the embodiment described above, S632, S634, S640, and S670 correspond to the processing as the period distance interpolation part.

Some embodiments of the present disclosure are described above; however, the present disclosure is not limited to the above embodiments, and can be carried out with various modifications.

[Modification 1]

For example, the above embodiments show configurations in which the target is detected using a FMCW system; however, the detection system is not limited thereto. For example, the target may be detected using a two-frequency CW system or FCM system.

The processing unit 70 and the method thereof described in the present disclosure may be realized by a dedicated computer provided by configuring a processor and memory programmed to perform one or more functions embodied in a computer program. Alternatively, the processing unit 70 and the method thereof described in the present disclosure may be realized by a dedicated computer provided by configuring a processor with one or more dedicated hardware logic circuits. Alternatively, the processing unit 70 and the method thereof described in the present disclosure may be realized by one or more dedicated computers configured by a combination of a processor and memory programmed to perform one or more functions, and a processor configured with one or more hardware logic circuits. In addition, the computer program may be stored in a computer-readable, non-transitory tangible storage medium as instructions to be executed by a computer. The method for realizing the function of each part included in the processing unit 70 does not necessarily have to include software. Some or all of the functions may be realized using one or more hardware components.

A plurality of functions possessed by a single constituent element in the embodiments described above may be realized by a plurality of constituent elements, or a single function possessed by a single constituent element may be realized by a plurality of constituent elements. Further, a plurality of functions possessed by a plurality of constituent elements may be realized by a single constituent element, or a single function realized by a plurality of constituent elements may be realized by a single constituent element. Moreover, some of the configurations of the embodiments described above may be omitted. In addition, at least some of the configurations of the embodiments described above may be added to or replaced with the configurations of the other embodiments described above.

In addition to the radar devices 11 and 12 described above, the present disclosure can be realized in various forms, such as a system using the radar devices 11 and 12 as constituent elements, a program for allowing a computer to function as the radar devices 11 and 12, a non-transitory tangible storage medium, such as a semiconductor memory, storing the program, a wall shape measurement method, and the like.

What is claimed is:

1. A wall shape measurement device configured to be mounted to a vehicle, the wall shape measurement device comprising:
a wall distance acquisition part configured to repeatedly determine whether a wall-like object installed along a road on which the vehicle is traveling is detected, using a reception signal obtained by receiving radar waves transmitted and reflected in a preset detection region around the vehicle, and to acquire, in response to the wall-like object being detected, a wall distance value indicating the distance to the wall-like object using the reception signal;

a wall shape calculation part configured to calculate a plurality of wall shape values indicating the positions of a plurality of locations on the surface of the wall-like object, using the traveling track of the vehicle and a plurality of the past wall distance values repeatedly acquired by the wall distance acquisition part;

a sudden change determination part configured to determine whether the wall distance value acquired by the wall distance acquisition part is suddenly changed, based on a preset sudden change determination condition; and an extrapolation part configured to, when the sudden change determination part determines that the wall distance value is suddenly changed, extrapolate the wall shape values after the sudden change determination part determines that the wall distance value is suddenly changed, wherein the wall shape calculation part calculates a wall distance filter value obtained by performing filter processing on the wall distance value acquired by the wall distance acquisition part, and further calculates a plurality of the wall shape values using the traveling track and a plurality of the wall distance filter values, and when the number of extrapolations, which is the number of times of continuously extrapolating the wall shape value by the extrapolation part, is less than a preset holding determination value, the extrapolation part holds the current wall distance filter value in the previous wall distance filter value to thereby extrapolate the wall shape value.

2. The wall shape measurement device according to claim 1, wherein when the number of extrapolations is less than a maximum determination value that is set to be more than the holding determination value, the extrapolation part brings the wall distance filter value closer to a preset maximum value to thereby extrapolate the wall shape value.

3. The wall shape measurement device according to claim 2, wherein when the number of extrapolations is equal to or more than the maximum determination value, the extrapolation part sets the wall distance filter value as an invalid value that is set to be more than the maximum value to thereby extrapolate the wall shape value.

4. The wall shape measurement device according to claim 1, wherein the wall shape calculation part calculates a wall distance filter value obtained by performing filter processing on the wall distance value acquired by the wall distance acquisition part, and further calculates a plurality of the wall shape values using the traveling track and a plurality of the wall distance filter values; and the sudden change determination condition when the extrapolation part does not perform extrapolation is such that a difference between the current wall distance value and the previous wall distance filter value is equal to or more than a preset sudden change determination value.

5. The wall shape measurement device according to claim 1, wherein the wall shape calculation part calculates a wall distance filter value obtained by performing filter processing on the wall distance value acquired by the wall distance acquisition part, and further calculates a plurality of the wall shape values using the traveling track and a plurality of the wall distance filter values; and the sudden change determination condition when the extrapolation part performs extrapolation is such that a difference between the current wall distance value and the wall distance filter value immediately before extrapolation is executed by the extrapolation part is equal to or more than a preset sudden change determination value.

6. The wall shape measurement device according to claim 1, further comprising:

a wall detection determination part configured to determine whether the wall-like object is detected; and a period interpolation part configured to, when the wall detection determination part determines that the wall-like object is detected, and when an extrapolation period in which extrapolation is executed by the extrapolation part is less than a preset interpolation determination time, interpolate a plurality of the wall shape values in the extrapolation period.

7. The wall shape measurement device according to claim 1, further comprising:

a wall detection determination part configured to determine whether the wall-like object is detected; and a distance interpolation part configured to, when the wall detection determination part determines that the wall-like object is detected, and when the traveling distance of the vehicle in an extrapolation period in which extrapolation is executed by the extrapolation part is less than a preset interpolation determination distance, interpolate a plurality of the wall shape values in the extrapolation period.

8. The wall shape measurement device according to claim 1, further comprising:

a wall detection determination part configured to determine whether the wall-like object is detected; and a period distance interpolation part configured to, when the wall detection determination part determines that the wall-like object is detected, when an extrapolation period in which extrapolation is executed by the extrapolation part is less than a preset interpolation determination time, and when the traveling distance of the vehicle in the extrapolation period is less than a preset interpolation determination distance, interpolate a plurality of the wall shape values in the extrapolation period.

9. The wall shape measurement device according to claim 6, wherein the wall shape calculation part calculates a wall distance filter value obtained by performing filter processing on the wall distance value acquired by the wall distance acquisition part, and further calculates a plurality of the wall shape values using the traveling track and a plurality of the wall distance filter values; and the wall detection determination part determines that the wall-like object is detected when a difference between the current wall distance value and the wall distance filter value immediately before extrapolation is executed by the extrapolation part is less than a preset wall detection determination value.

* * * * *